3,336,375
PREPARATION OF CARBOXYLIC ACIDS AND HYDROXYLAMMONIUM FORMATE FROM NITROPARAFFINS
Lawrence R. Jones, Terre Haute, Ind., assignor to Commercial Solvents Corporation, New York, N.Y., a corporation of Maryland
No Drawing. Filed July 6, 1965, Ser. No. 469,916
5 Claims. (Cl. 260—540)

This invention relates to a process for the production of hydroxylammonium formate and monocarboxylic acid. In a particular aspect this invention relates to a process for the production of hydroxylammonium formate and monocarboxylic acid by reacting a primary nitroparaffin with formic acid.

In U.S. Patent No. 2,381,410, issued Aug. 7, 1945, it is disclosed that hydroxylamine and monocarboxylic acid are obtained by heating a primary nitroparaffin and hydrochloric acid in the presence of a monocarboxylic acid. Acetic acid, propionic acid and butyric acid are specifically mentioned. It is stated in the patent that the monocarboxylic acid serves principally as a solvent for the primary nitroparaffin and the hydrochloric acid.

In the prior art process the hydroxylamine is obtained as the crystalline salt of hydrochloric acid (hydroxylamine hydrochloride). If other forms of hydroxylamine such as hydroxylammonium formate or hydroxylammonium acid sulfate are desired, it is necessary to dissolve the crystalline salt in a suitable solvent such as water or methanol and then convert the hydroxylamine to the desired form. As an example, hydroxylammonium formate is obtained from the crystalline hydroxylamine hydrochloride by a multi-step procedure which includes dissolving the hydroxylamine hydrochloride in methanol then adding sodium formate to the solution to precipitate sodium chloride and to form hydroxylammonium formate and finally filtering the solution to remove the precipitated sodium chloride. Hydroxylammonium formate is a form of hydroxylamine which is highly soluble in organic solvents and is much less corrosive to metals than the mineral salt of hydroxylamine. There has thus been a need for a simple and direct process for producing hydroxylammonium formate.

An object of the present invention is to provide a process for the production of hydroxylammonium formate and monocarboxylic acid.

A further object of the invention is to provide a process for the production of monocarboxylic acid and hydroxylammonium formate without first producing a mineral salt of hydroxylamine.

An additional object of the present invention is to provide a process for the production of monocarboxylic acid and hydroxylammonium formate without the employment of a mineral acid in the process.

Still further objects and advantages of the present invention will be apparent from the specification and appended claims.

It has been discovered in accordance with the present invention that monocarboxylic acid and hydroxylammonium formate are obtained by reacting a primary nitroparaffin with formic acid without the employment of hydrochloric acid in the reaction step. Acetic acid, propionic acid and butyric acid are not successfully employed in the present invention. The reaction results in the conversion of the primary nitroparaffin to the corresponding monocarboxylic acid and to hydroxylammonium formate.

The reaction is illustrated as follows:

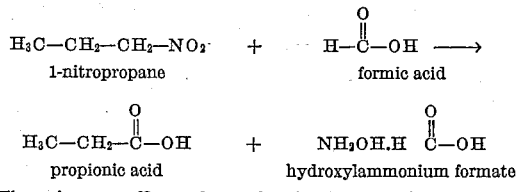

The nitroparaffins of use in the present invention are primary nitroparaffins, that is to say nitroparaffins wherein the nitro group is bonded to a carbon atom which is in turn bonded to at least two hydrogen atoms. Typically suitable primary nitroparaffins are represented by the formula R—NO$_2$ where R is an alkyl radical having from one up to about seven carbon atoms. Representative primary nitroparaffins include nitromethane, nitroethane, 1-nitropropane, 1-nitrobutane, 1-nitropentane, 1-nitrohexane and 1-nitroheptane. Monocarboxylic acids prepared from such typical primary nitroparaffins are represented by the formula

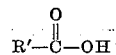

where R' is hydrogen or an alkyl radical having from one up to about six carbon atoms. Representative monocarboxylic acids include formic acid, acetic acid, butyric acid, pentanoic acid, propionic acid, and hexanoic acid.

In accordance with the present invention a primary nitroparaffin and formic acid are reacted to obtain hydroxylammonium formate and monocarboxylic acid. The process of the invention is suitably carried out by heating a mixture of primary nitroparaffin and formic acid under reflux conditions.

Temperatures employed in the reaction may vary and will depend in part on the particular nitroparaffin employed. In the process temperatures in the range of about 80 to about 120° C. at atmospheric pressure are typically employed.

The formic acid of use in the present invention may be of any suitable form. For example, either aqueous or anhydrous formic acid may be employed. While hydroxylammonium formate and monocarboxylic acid are obtained when concentrations of aqueous formic acid lower than about 70% are utilized, best results are obtained when the concentration of aqueous formic acid is in excess of about 70% as for example in the range of from about 70 to about 100%.

The molar ratio of formic acid to primary nitroparaffin is of importance in the present invention. While hydroxylammonium formate and monocarboxylic acid are obtained at lower ratios, best results are obtained when the molar ratio of formic acid to primary nitroparaffin is in excess of 1:1, for example in the range of 2:1 to 5:1.

The hydroxylammonium formate and the monocarboxylic acid produced according to the process of the present invention may be recovered from the reaction medium by any suitable procedure. One procedure for recovering monocarboxylic acid and hydroxylammonium formate involves distilling the reaction medium prepared by reacting a primary nitroparaffin and formic acid to remove the monocarboxylic acid and then concentrating the distilled reaction medium to precipitate the hydroxylammonium formate.

In the alternative, the hydroxylammonium formate may be recovered as the salt of a strong mineral acid such as hydrochloric acid or sulfuric acid. A procedure for recovering hydroxylamine as mineral acid salt involves adding aqueous mineral acid to the reaction medium then distilling the reaction medium to remove monocarboxylic acid and finally evaporating the distilled reaction medium to dryness to obtain the hydroxylamine mineral acid salt.

The invention will be understood more fully by reference to the specific examples. It is understood that the examples are presented for purposes of illustration only and are not intended as a limitation of the invention.

Example 1

Hydroxylammonium formate and propionic acid were prepared by refluxing a mixture of 27 g. of 1-nitropropane and 6 mls. of aqueous formic acid (88% concentration) for twenty hours at a temperature in the range of about 95 to about 105° C. Hydroxylammonium formate was obtained in a yield of 60% based on the 1-nitropropane starting material.

Example 2

The procedure of Example 1 is repeated in all essential details with the exception that 1-nitroethane is substituted for 1-nitropropane. Acetic acid and hydroxylammonium formate are obtained.

Example 3

The procedure of Example 1 is repeated in all essential details with the exception that nitromethane is substituted for 1-nitropropane. Formic acid and hydroxylammonium formate are obtained.

Example 4

The procedure of Example 1 is repeated in all essential details with the exception that 1-nitrobutane is substituted for 1-nitropropane. Butyric acid and hydroxylammonium formate are obtained.

Since many embodiments of this invention may be made and since many changes may be made in the embodiments described, the foregoing is interpreted as illustrative only and the invention is defined by the appended claims.

I claim:
1. A process for the production of hydroxylammonium formate and monocarboxylic acid which consists essentially of reacting under reflux conditions a primary nitroparaffin with formic acid.

2. A process for the production of hydroxylammonium formate and monocarboxylic acid which consists essentially of heating under reflux conditions a primary nitroparaffin of the formula R—$NO_2$ where R is an alkyl radical having from one up to seven carbon atoms in the presence of formic acid thereby producing hydroxylammonium formate and monocarboxylic acid of the formula

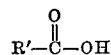

wherein R' is a member selected from the group consisting of hydrogen and an alkyl radical having from one up to six carbon atoms.

3. The process of claim 2 wherein the reaction temperature is in the range of from about 80 to about 120° C.

4. The process of claim 2 wherein the molar ratio of formic acid to primary nitroparaffin is in the range of from about 1:1 to about 5:1.

5. The process of claim 2 wherein the concentration of the formic acid is in the range of from about 70 to 100%.

References Cited

UNITED STATES PATENTS 2,113,814   4/1938   Lippincott _____ 260—540

LORRAINE A. WEINBERGER, *Primary Examiner.*

V. GARNER, *Assistant Examiner.*